(12) United States Patent
Smith

(10) Patent No.: US 8,654,639 B2
(45) Date of Patent: Feb. 18, 2014

(54) RECEIVER WHICH MIMICS DEGRADED RADIO CONDITIONS WHEN BUFFER OVERFLOW CONDITIONS ARE MET

(75) Inventor: Timothy Condren Smith, Cambridgeshire (GB)

(73) Assignee: Cambridge Silicon Radio Limited, Cambridge (GB)

(*) Notice: Subject to any disclaimer, the term of this patent is extended or adjusted under 35 U.S.C. 154(b) by 340 days.

(21) Appl. No.: 12/355,005

(22) Filed: Jan. 16, 2009

(65) Prior Publication Data

US 2009/0201815 A1 Aug. 13, 2009

(30) Foreign Application Priority Data

Feb. 8, 2008 (GB) ................................. 0802297.2

(51) Int. Cl.
*H04L 1/00* (2006.01)

(52) U.S. Cl.
USPC ............................................ 370/231; 455/69

(58) Field of Classification Search
USPC .................... 370/231, 236, 229, 235
See application file for complete search history.

(56) References Cited

U.S. PATENT DOCUMENTS

| | | | |
|---|---|---|---|
| 5,276,681 A * | 1/1994 | Tobagi et al. | 370/229 |
| 6,690,645 B1 * | 2/2004 | Aweya et al. | 370/230 |
| 6,717,926 B1 * | 4/2004 | Deboille et al. | 370/330 |
| 6,839,350 B1 * | 1/2005 | Inouchi et al. | 370/392 |
| 7,006,440 B2 * | 2/2006 | Agrawal et al. | 370/235 |
| 7,027,407 B2 * | 4/2006 | Diepstraten et al. | 370/252 |
| 2002/0097678 A1 * | 7/2002 | Bisher et al. | 370/232 |
| 2002/0191570 A1 * | 12/2002 | Kim et al. | 370/335 |
| 2003/0204600 A1 * | 10/2003 | Stoner et al. | 709/227 |
| 2003/0236827 A1 * | 12/2003 | Patel et al. | 709/203 |
| 2005/0276219 A1 * | 12/2005 | Wang et al. | 370/229 |
| 2008/0002761 A1 * | 1/2008 | Edsall et al. | 375/222 |
| 2008/0075003 A1 * | 3/2008 | Lee et al. | 370/230 |
| 2009/0180549 A1 * | 7/2009 | Hosein et al. | 375/240.25 |

* cited by examiner

*Primary Examiner* — Kimbrom T Hailu
*Assistant Examiner* — Benjamin Lamont
(74) *Attorney, Agent, or Firm* — Fulbright & Jaworski LLP

(57) ABSTRACT

Methods and apparatus for providing a flow control mechanism in a wireless network are described. In order to force a transmitting station to implement a rate adaptation mechanism, in which speed is traded off for reliability, a receiver within a receiving station behaves as if the radio conditions were degraded. This may be implemented when defined criteria are met, such as when the available buffer space falls below a threshold, and for some or all types of frames. In an embodiment, when the criteria are met, the receiver does not acknowledge frames received at one or more higher data rates.

14 Claims, 5 Drawing Sheets

RECEIVER WHICH MIMICS DEGRADED RADIO CONDITIONS WHEN BUFFER OVERFLOW CONDITIONS ARE MET

BACKGROUND

Flow control mechanisms are provided in many digital radio protocols, including Bluetooth, to allow a receiver to request that a transmitter pause transmission for a short period of time before resuming data transmission. These mechanisms are useful in preventing loss of frames (or packets) where there are short bursts of high throughput which might otherwise overload the receiver. Other protocols, such as IEEE 802.11 (also known as 'Wi-Fi'), provide no such flow control mechanism as it is expected that the receiving device will be able to cope with the maximum possible data throughput.

Typically Wi-Fi enabled devices have had relatively powerful processors and large amounts of memory (e.g. laptop computers). However, as Wi-Fi connectivity is integrated into smaller devices, such as mobile telephones and PDAs (personal digital assistants), the power consumption of the Wi-Fi modules becomes important. Use of a soft MAC (media access controller), where most of the code resides on the host processor and only time critical operations are performed on the MAC itself, uses a lot of power and as a result is not suitable for highly mobile applications. An alternative is to use a single Wi-Fi chip solution, which integrates a 2.4 GHz radio, MAC and other radio components and has extremely low power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus for providing a flow control mechanism in a wireless network are described. In order to force a transmitting station to implement a rate adaptation mechanism, in which speed is traded off for reliability, a receiver within a receiving station behaves as if the radio conditions were degraded. This may be implemented when defined criteria are met, such as when the available buffer space falls below a threshold, and for some or all types of frames. In an embodiment, when the criteria are met, the receiver does not acknowledge frames received at one or more higher data rates.

A first aspect provides method of operating a receiver comprising: receiving frames from a transmitting station; and when buffer overflow conditions are met, mimicking degraded radio conditions for at least a subset of the frames received to induce a rate adaptation mechanism at the transmitting station.

The buffer overflow conditions may be defined in terms of one or more of: input data rate, output data rate, and available buffer space.

A portion of the available buffer space may be reserved for traffic types which are not retransmitted.

The subset of the frames received may comprise frames which exceed a threshold size.

Mimicking degraded radio conditions may comprise: stopping acknowledging at least a subset of the frames received at one or more data rates; and dropping said at least a subset of the frames.

Stopping acknowledging at least a subset of the frames received at one or more data rates may comprise: applying a mask to a list of accepted data rates to remove the one or more data rates from the list.

The mask may be applied for frames exceeding a threshold size.

The one or more data rates may not include a lowest mandatory data rate or a data rate at which beacons are transmitted.

A second aspect provides a device comprising: a receiver; and a buffer, wherein the receiver is arranged to: receive frames from a transmitting station; and when buffer overflow conditions are met, to mimic degraded radio conditions for at least a subset of the frames received to induce a rate adaptation mechanism at the transmitting station.

The buffer overflow conditions may be defined in terms of one or more of: input data rate, output data rate, and available space in the buffer.

The subset of the frames received may comprise frames which exceed a threshold size.

Mimicking degraded radio conditions may comprise: stopping acknowledging at least a subset of the frames received at one or more data rates; and dropping said at least a subset of the frames.

The one or more data rates may not include a lowest mandatory data rate or a data rate at which beacons are transmitted.

The device may be a single chip wireless solution.

A third aspect provides a method of operating a receiver comprising: operating a in first mode if buffer conditions are not met; and switching to a second mode of operation when buffer conditions are met, wherein in the first mode, the receiver receives and acknowledges frames in accordance with a radio protocol, and wherein in the second mode, the receiver mimics degraded radio conditions for at least a subset of frames received to induce a rate adaptation mechanism at the transmitting station.

In the first mode, frames received at any of a set of accepted data rates may be acknowledged according to the radio protocol, and in the second mode, one or more data rates may be removed from the set of accepted data rates to create a revised set of accepted data rates and frames received at any of the revised set of accepted data rates are acknowledged according to the radio protocol.

The radio protocol may be Wi-Fi.

The buffer conditions may be defined in terms of one or more of: input data rate, output data rate, frame size and available space in the buffer.

The buffer conditions may comprise a condition that a frame received exceeds a threshold frame size.

The revised set of accepted data rates may comprise at least a lowest mandatory data rate and a data rate at which beacons are transmitted.

The methods described herein may be performed by firmware or software in machine readable form on a storage medium. The software can be suitable for execution on a parallel processor or a serial processor such that the method steps may be carried out in any suitable order, or simultaneously.

A fourth aspect provides a computer program arranged to perform any of the methods described herein. The computer program may be stored on a tangible machine readable medium.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
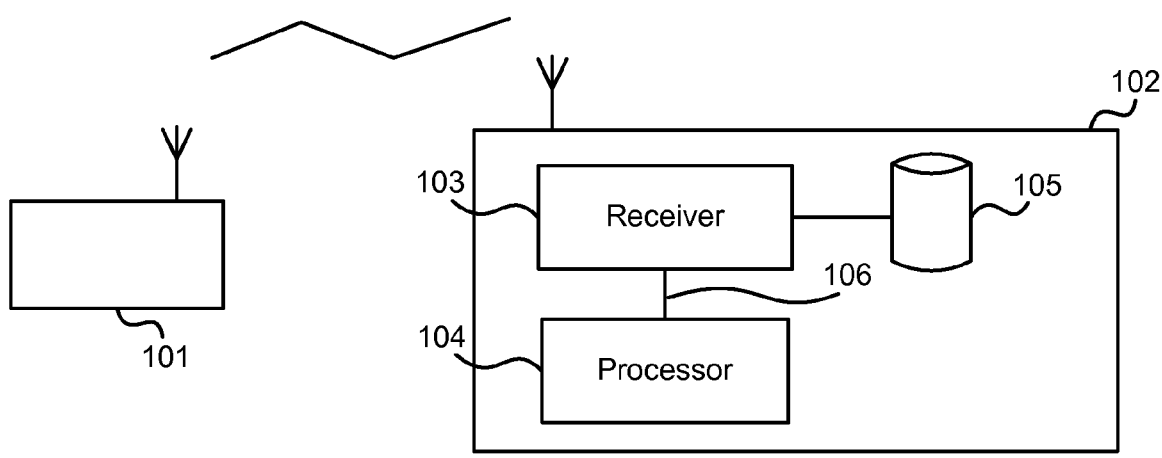
FIG. 1 is a schematic diagram of a wireless network.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a schematic diagram of a wireless network which comprises a transmitting station 101, which may be an access point, and a receiving station 102. The receiving station comprises a receiver 103 and a processor 104. The receiver 103 has an associated buffer 105. Where a wireless protocol is used which does not include a flow control mechanism (such as IEEE 802.11), problems arise where data arrives at the receiving station 102 faster than the receiver 103 can deliver the data to the processor 104. In the short term, data which cannot be delivered to the processor can be stored in the receiver's buffer; however if this buffer becomes full frames may be lost.

The situation where data arrives faster than it can be delivered to the processor may arise where there is very high throughput of data from the transmitting station to the receiving station (e.g. a short burst of considerably higher than normal throughput), or where the transport mechanism 106 between the receiver and the processor is too slow, or where the processor is slow and/or busy. These problems are more likely to occur in highly mobile applications because the processing power of the processor is limited (e.g. by power consumption and/or cost) and the size of the receiver's buffer may be small. Furthermore, as radio protocols develop, higher and higher transmission rates are being enabled and unless the processor and transport speeds increase in a corresponding manner, these problems may become more prevalent.

It will be appreciated that FIG. 1 shows logical elements within a receiving station 102 and one or more of the elements shown may be combined in any way. In an example, the receiver 103 and buffer 106 shown in FIG. 1 may be implemented within a single Wi-Fi chip.

Figure 2:
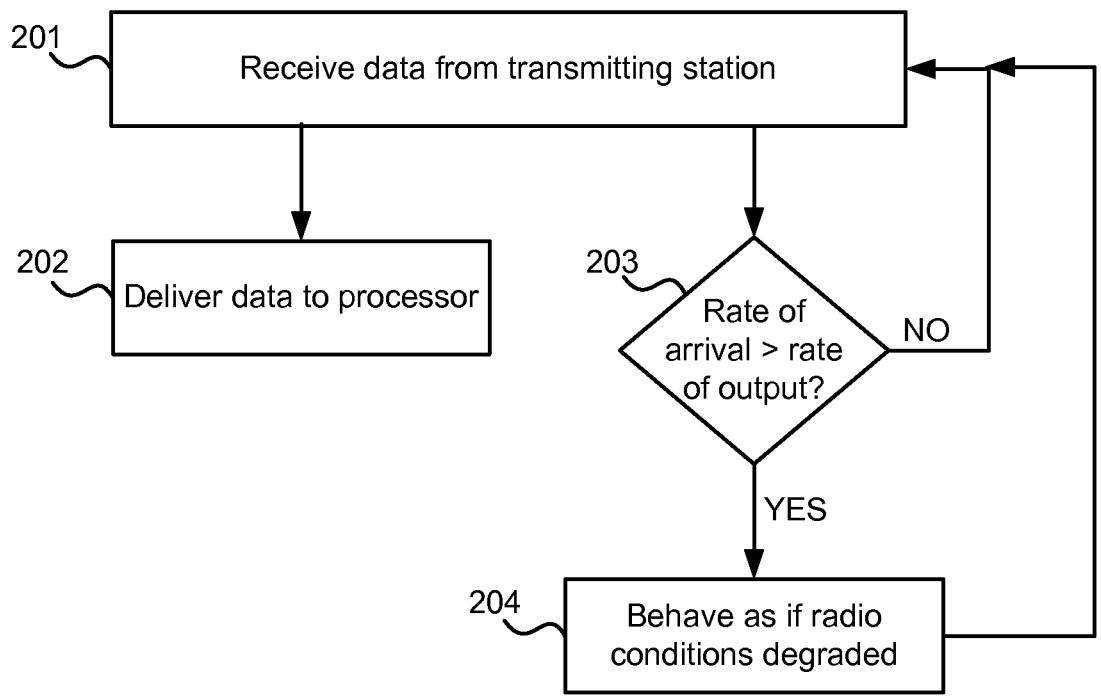
FIGS. 2-5 show flow diagrams of example methods of operation of a receiver which provide a flow control mechanism.

FIG. 2 shows a flow diagram of an example method of operation of the receiver which provides a flow control mechanism. The receiver receives data from the transmitting station (block 201) and delivers the data to the processor (block 202). In parallel, the receiver monitors how the rate of arrival of data compares to the rate of output of data from the receiver (block 203). If the rate of arrival does not exceed the rate of output ('No' in block 203), a problem is not likely to occur and the receiver can operate in a standard manner. However, once the rate of arrival exceeds the rate of output ('Yes' in block 203), the mismatch will result in data being stored in the receiver's buffer which, dependent on its size, may become full rapidly. To address this, the receiver modifies its behaviour to mimic the situation where the radio conditions between the transmitting and receiving stations are degraded (block 204).

The precise behaviour of the receiver (in block 204) will depend on the particular radio protocol being used for data transmission between the transmitting station and the receiving station and a number of examples are described below. However, as most over the air protocols include a mechanism by which the transmitting station trades off between transmission speed and reliability, this method is applicable to any radio protocol, whether or not it also includes a flow control mechanism within the protocol. This mechanism which trades off between transmission speed and reliability is referred to herein as a 'rate adaptation mechanism'.

The operation of the receiver (in block 204) results in the transmitting station determining that the radio conditions have degraded and as a result the transmitting station reduces the transmission data rate (e.g. through reduction of the actual transmission rate or by increasing forward error correction and hence reducing the amount of data destined for the processor, as opposed to error correction code, which is transmitted).

The receiver may subsequently return to normal operation, for example, once any congestion of the processor or the transport mechanism has disappeared or following a high throughput burst of traffic. In some embodiments, the receiver may also return to normal operation upon determination that the incoming data stream is not a high throughput burst of data but a sustained high throughput stream and in which case higher layer protocols may be used to respond to dropped frames caused by the receiver buffer becoming full. In other embodiments, the modified operation (as in block 204) may continue for sustained high throughput streams of data. Any return to normal may be implemented immediately (e.g. by the receiver stopping mimicking poor radio conditions) or may be implemented gradually (e.g. by mimicking a gradual improvement in radio conditions).

Whilst the flow diagram of FIG. 2 shows the decision point (in block 203) being based on a comparison of the rate of arrival of data and the rate of output to the processor, in other examples, the decision point may be based on other factors, such as the amount of available buffer space. The conditions which are used to make this decision may be referred to as 'buffer conditions' or 'buffer overflow conditions'.

The following description provides a detailed example for IEEE 802.11. This protocol is used by way of example only and the techniques described herein are applicable to any radio protocol and are particularly beneficial for radio protocols which do not otherwise provide a flow control mechanism. Although the following description refers to frames, it may alternatively refer to data packets.

IEEE 802.11 provides a number of different transmission rates which may be used to transmit data. For example, IEEE 802.11g provides 12 different transmission rates ranging from 54 Mbit/s to 1 Mbit/s. The faster rates generally only work reliably when the transmitting station and the receiving station are close together, whilst the lower rates can work over larger distances. When a receiving station attempts to join a network, beacons detail the mandatory rates, i.e. the rates that the receiver must support to join the network, and the optional rates, i.e. the rates that the receiver may support. The beacons themselves are typically transmitted at the lowest mandatory rate.

Ideally data is transmitted at the highest possible rate, however when radio conditions are degraded, the rate used is reduced so that the transmission still occurs reliably. Each transmitting station uses a rate adaptation mechanism which uses information on successful and failed frames to determine the appropriate transmission rate to use, which is typically the fastest transmission rate which works.

Figure 3:
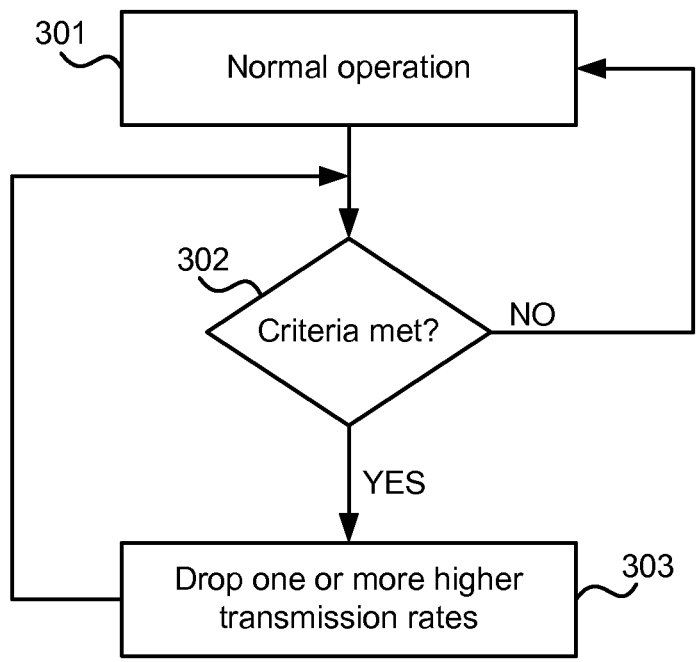

FIG. 3 shows a method of operation of a receiver. Initially the receiver operates normally (block 301), i.e. it receiver receives data from the transmitting station and delivers the data to the processor and all received frames are acknowledged in accordance with the radio protocol. In parallel, certain parameters are monitored to see if defined criteria are met (block 302), which would cause the receiver to change its mode of operation and drop one or more of the higher transmission rates (block 303). The parameters monitored and the criteria used are described in more detail below. Transmission rates are dropped by the receiver failing to acknowledge receipt of frames at a particular rate, such that the transmitting station determines that transmission has failed. Those frames which are not acknowledged by the receiver can be dropped (and not stored in the buffer or output to the processor) as the transmitting station will re-transmit this frame at a lower data rate. The failure of one or more frames results in the rate adaptation mechanism within the transmitting station selecting a lower transmission rate, which therefore reduces the amount of data being received by the receiver and mitigates or eliminates the problems experienced by the receiver. Furthermore, as the frame transmitted at the higher rate was not acknowledged, this frame will be re-transmitted by the transmitting station, which provides additional time for any backlog at the receiver to reduce.

The transmission rates which are accepted by the receiver at any time may be referred to as the 'accepted rates'. A frame at an accepted rate will be acknowledged on receipt and will be forwarded to the processor (having been stored in the buffer if required), whilst a frame at a rate which is not on the accepted rates list will not be acknowledged and will be dropped. The accepted rates list normally defaults to all supported transmission rates, but rates may be removed from this list according to whether criteria are met (in block 302).

The accepted rates list always includes at least one mandatory rate and always includes the rate at which the beacons are transmitted, which is typically the lowest mandatory rate. The optional rates may be dropped before any of the mandatory rates are dropped such that in many cases the accepted rates list includes all the mandatory rates.

The parameters used in defining the criteria which determine (in block 302) whether a receiver modifies its operation may include one or more of the following:
  data rate in to the receiver
  data rate out of the receiver
  available buffer space
  traffic type
  frame size
  frame priority
  Quality of Service (QoS) type One or more of these parameters may also be used in determining which data rates are removed from the accepted rates list and hence will be dropped (in block 303).

Data rate in and data rate out may be used as described above with reference to FIG. 2, such that the behaviour of the receiver is modified when the data rate in exceeds the data rate out. In an example, data rates may be removed from the accepted rates list (and hence frames dropped) which would result in the data rate exceeding the data rate out.

Where available buffer space is used to define the criteria, one or more thresholds may be used. In the single threshold case, where the available buffer space exceeds the threshold, the receiver operates normally (i.e. it acknowledges those frames received in the standard manner for the particular radio protocol used) and where the available buffer space falls below the threshold ('Yes' in block 302), one or more of the higher transmission rates are dropped by failing to acknowledge frames received, i.e. these one or more higher transmission rates are removed from the accepted rates list. Where multiple thresholds are used, different data rates may be dropped according to the amount of available buffer space. For example, once the available buffer space falls below a first threshold, all the optional rates may be dropped (and hence removed from the accepted rates list) and once the available buffer space falls below a second threshold, all the mandatory rates which exceed the rate at which the beacons are transmitted (typically the lowest mandatory rate) will be dropped. In another example, an algorithm may be used which computes the apparent incoming data rate and excludes transmission rates from the accepted rates list such that the buffer never becomes full (e.g. in the manner of Xeno's Paradox). This is an iterative algorithm, in which as the available buffer space is reduced, additional transmission rates are dropped.

The criteria may only apply to particular traffic types, or may exclude certain traffic types. For example, for those traffic types which are not re-transmitted, such as broadcast or multicast traffic, no acknowledgements are ever sent to the transmitting station. The criteria may therefore exclude such traffic. In order that the receiver can receive these frames without becoming overloaded, some buffer space may be reserved for this traffic (and hence this reserved space may be deducted from the available buffer space). In another example, the method may not be applied to those types of traffic which are known to adapt to lost frames whilst the method may be applied to other traffic types.

All sizes of frames may be treated in the same way or alternatively the criteria may specify certain thresholds of frame sizes or other frame size based criteria. For example, where a frame exceeds a size threshold, rates may be dropped if other criteria are satisfied (e.g. available buffer falls below a threshold), whilst for smaller frames all rates may be accepted irrespective of other criteria (e.g. even when the buffer is close to being full). Some types of traffic have distinctive frame sizes, such as Voice over IP (VoIP) traffic which comprises small frames, and therefore criteria which include a frame size aspect can also be used to prioritise particular traffic types.

Other aspects of the traffic or frames may be used in defining the criteria, such as the frame priority or the QoS type of the frame. In an example, rates may be dropped for those frames with a lower priority or lower QoS type, whilst those frames with a higher priority or QoS type may be acknowledged at the higher rates.

Where the criteria are defined in terms of thresholds, masks may be applied to the accepted rates list to define those supported rates which are accepted. For example, a mask may be applied for frames which exceed a certain size but not to frames which do not exceed this size threshold. The mask may define either those rates which are to be excluded from the accepted rates list or alternatively may define only those rates which are to be included within the accepted rates list. Different masks may be applied in different situations (i.e.

based on the specified criteria), for example, different masks may be applied for different frame sizes.

The receiver may subsequently return to normal operation (block 301) when defined criteria are met (as determined in block 302). These criteria used to determine when the receiver returns to normal operation may be the same as those used in determining when to stop normal operation, or alternatively different criteria may be used. On returning to normal operation, the accepted rates list may be changed instantaneously to include all supported rates (e.g. by adding those rates which had been removed in block 303) or the return to normal operation may be implemented gradually, by a gradual increase in the number of accepted rates until the accepted rates list includes all supported rates.

The methods described above result in loss of little or no data and enable the receiving station to stay connected to the transmitting station. The methods are arranged to manage short bursts of high throughput and in some examples may also be used to manage sustained streams of high throughput. The methods are also arranged to manage periods where the processor or transport within the receiving station is busy, such that the receiver cannot offload the data received.

If these methods are not implemented, alternative options include:

Stopping acknowledging all frames and dropping those frames received

Acknowledging frames and then dropping them

Reserving the medium

Entering a powersave mode (e.g. as provided in IEEE 802.11)

However, all these options are problematic.

If the receiver stops acknowledging all frames, the transmitting station will apply its rate adaptation mechanism (as described above) and in the absence of any acknowledgements it will disconnect the receiving station from the network after a short period of time, in the same way that a receiving station that goes out of range or switches off is disconnected from the network.

If the receiver continues to acknowledge frames, once its buffer has become full, but then drops those acknowledged frames, the transmitting station continues to transmit data to the receiving station and the receiving station remains connected to the network. Higher layer protocols may then be used to recover the lost frames. However, some higher layer protocols (such as TCP) which are able to recover from links which degrade gradually, are not able to deal satisfactorily with links where suddenly all the traffic is lost. The lost frames trigger re-transmission mechanisms which results in additional throughput over the link both of acknowledgments and re-transmitted frames, many of which may also be lost whilst the receiver backlog is cleared. This is very inefficient as it uses more power in the receiving station (and therefore shortens battery life), and also can result in vary unstable conditions (e.g. where the actual rate of data transmission varies widely and does not stabilise).

One way to stop the transmitting station from transmitting any more frames to the receiving station is for the receiving station to reserve the medium. This may, for example, be implemented by sending an IEEE 802.11 CTS-to-self message, which reserves the medium and prevents anyone from transmitting. This however would slow down the entire network and is therefore not a viable solution.

In the power save mode in IEEE 802.11, frames are not received by the receiver unless the receiver requests them from the transmitting station. When the receiving station enters power save mode, no more frames are added to the transmitting station's transmit queue (unless requested by the receiving station), but in many real implementations the transmitting station continues to transmit the frames which are already queued. If these frames are then not acknowledged, the transmitting station soon disconnects the receiving from the station from the network (as described above). Consequently, where the transmitting station's transmit queue is larger than the receiver's buffer, using power save mode does not solve the problem of an overflowing receiver buffer.

Figure 4:
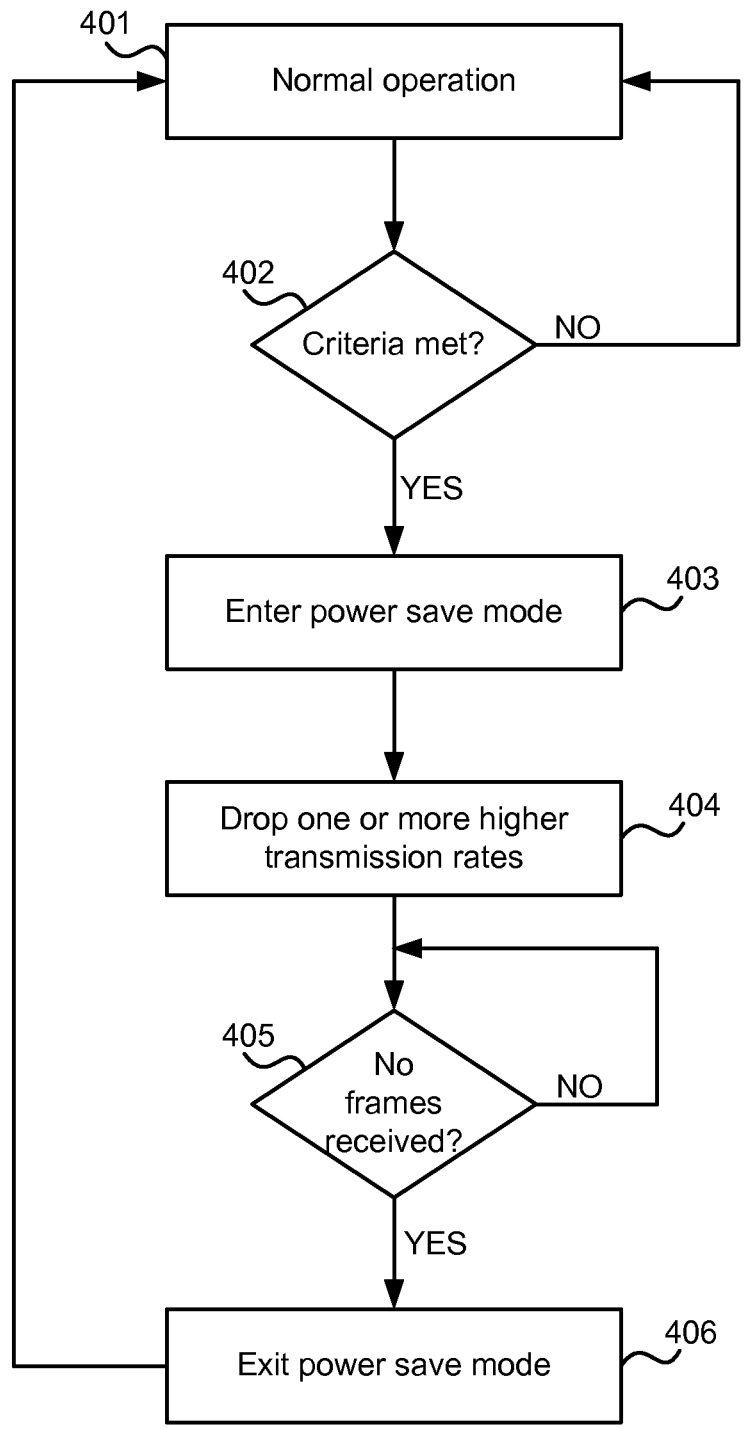

The methods described above with reference to FIGS. 2 and 3 may however be used to transition gradually to a power save mode, as shown in FIG. 4. The receiver initially operates normally (block 401), i.e. it receives data from the transmitting station and delivers the data to the processor and acknowledges those frames it receives in the standard manner. However, if defined criteria are met which indicate that the receiver buffer is likely to become full ('Yes' in block 402), the operation of the receiver changes. As described above, these criteria may be based on many different factors (e.g. data rate in, data rate out, available buffer) and may include other parameters (e.g. traffic type, frame priority, frame size etc). When the criteria are met ('Yes' in block 402), the receiver enters power save mode (block 403) and at this point the transmitting station stops adding frames to its transmit queue. In order that those frames already in the queue can be received with minimal frame loss, the receiver also changes its mode of operation and drops one or more of the higher transmission rates (block 404) or otherwise mimics poor radio conditions, as described above. Once the transmitting station's transmit queue is empty, the receiver will not receive any further frames (as determined in block 405). At this point, the receiver may exit power save mode (block 406) and return to normal operation (block 401). Alternatively, the receiver may continue in power save mode (not shown in FIG. 4) and request frames from the transmitting station.

Figure 5:
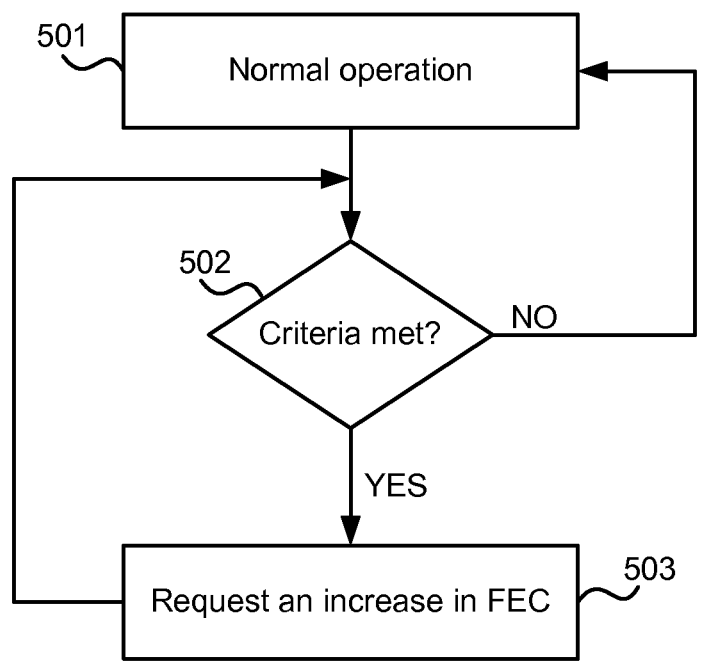

As described above IEEE 802.11 is an example of a radio protocol where the methods described herein may be implemented. In another example, a protocol may be used where the trade off between transmission speed and reliability is effected by increasing the amount of error correction code (ECC) included within each frame, as shown in FIG. 5. By increasing the amount of ECC in a frame, the amount of data transmitted in each frame is reduced, whilst the actual data rate used for transmission may remain substantially constant. Bluetooth is an example of such a radio protocol. As shown in FIG. 5, the receiver switches out of normal operation (block 501) when defined criteria are met (as determined in block 502). As described above, these criteria may be based on many different factors (e.g. data rate in, data rate out, available buffer) and may include other parameters (e.g. traffic type, frame priority, frame size etc). When these criteria are met ('Yes' in block 502), the receiver requests an increase in forward error correction (FEC, block 503). Subsequently, when the same or different criteria are met, the receiver may return to normal operation (block 501).

The methods described above enable a receiver to manage situations where its buffer becomes full with the loss of little or no data. This may enable receivers to be provisioned with less memory than would otherwise be necessary. Additionally, the methods are power efficient, leading to reduced power usage and longer battery life (for battery powered devices).

The methods described above are particularly applicable to the single Wi-Fi chip solution where the available on-chip buffer may be small (e.g. less than the size of the TCP window). In some instances this buffer may only be able to hold a few frames, and in some instances the buffer space is allocated in terms of frames irrespective of the size of the frames.

Although the above description refers to the receiver delivering the received data to a processor (as shown in FIG. 1), it will be appreciated that the methods are also applicable where the received data is output by the receiver to any destination.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise and exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of operating a wireless receiver comprising:
receiving frames from a wireless transmitting station; and
when buffer overflow conditions are met, mimicking degraded radio conditions for at least a subset of the frames received to induce a rate adaptation mechanism at the transmitting station;
wherein mimicking degraded radio conditions comprises:
stopping acknowledging of at least a subset of the frames received at one or more data rates by applying a mask to a list of accepted data rates to remove the one or more data rates from the list, the mask defining at least one of a set of rates to be excluded from the list of accepted data rates or a set of rates which are to be included within the list of accepted data rates, wherein the mask is applied for frames exceeding a threshold size; and
dropping the frames exceeding the threshold size according to the masked list of accepted data rates,
wherein the one or more data rates do not include a data rate at which beacons are transmitted and do include all mandatory data rates which exceed the data rate at which beacons are transmitted.

2. A method according to claim 1, wherein the buffer overflow conditions are defined in terms of one or more of: input data rate, output data rate, and available buffer space.

3. A method according to claim 2, wherein a portion of the available buffer space is reserved for traffic types which are not retransmitted.

4. A method according to claim 1, further comprising modifying the mask defining one of: a set of rates to be excluded from the list of accepted data rates and a set of rates which are to be included within the list of accepted data rates, based on one or more parameters.

5. A method according to claim 1, wherein the mask is further applied for frames with a lower priority or lower QoS type.

6. A device comprising:
a wireless receiver; and
a buffer,
wherein the wireless receiver is arranged to:
receive frames from a wireless transmitting station; and
when buffer overflow conditions are met, to mimic degraded radio conditions for at least a subset of the frames received to induce a rate adaptation mechanism at the transmitting station;
wherein mimicking degraded radio conditions comprises:
stopping acknowledging of at least a subset of the frames received at one or more data rates by applying a mask to a list of accepted data rates to remove the one or more data rates from the list for frames which exceed a predetermined size, the mask defining at least one of a set of rates to be excluded from the list of accepted data rates or a set of rates which are to be included within the list of accepted data rates, wherein the mask is applied for frames exceeding a threshold size; and
dropping the frames exceeding the threshold size according to the masked list of accepted data rates,
wherein the one or more data rates do not include a data rate at which beacons are transmitted and do include all mandatory data rates which exceed the data rate at which beacons are transmitted.

7. A device according to claim 6, wherein the buffer overflow conditions are defined in terms of one or more of: input data rate, output data rate, and available space in the buffer.

8. A device according to claim 6, wherein the device is a single chip wireless solution.

9. A method of operating a receiver comprising:
operating in a first mode of operation when buffer conditions are not met; and
switching to a second mode of operation when buffer conditions are met,
wherein in the first mode of operation, the receiver receives and acknowledges frames in accordance with a radio protocol, and
wherein in the second mode of operation, the receiver mimics degraded radio conditions for at least a subset of frames received to induce a rate adaptation mechanism at the transmitting station;
wherein mimicking degraded radio conditions comprises:
stopping acknowledging of at least a subset of the frames received at one or more data rates by applying a mask to a list of accepted data rates to remove the one or more data rates from the list for frames which exceed a predetermined size, the mask defining at least one of a set of rates to be excluded from the list of accepted data rates or a set of rates which are to be included within the list of accepted data rates, wherein the mask is applied for frames exceeding a threshold size; and
dropping the frames exceeding the threshold size according to the masked list of accepted data rates,
wherein in the first mode, frames received at any of a set of accepted data rates are acknowledged according to the radio protocol, and in the second mode, one or more data rates are removed from the set of accepted data rates to create a revised set of accepted data rates and frames received at any of the revised set of accepted data rates are acknowledged according to the radio protocol, and
the revised set of accepted data rates comprises a data rate at which beacons are transmitted and does not include any mandatory data rates which exceed the data rate at which beacons are transmitted.

10. A method according to claim 9, wherein the radio protocol is Wi-Fi.

11. A method according to claim 9, wherein the buffer conditions are defined in terms of one or more of: input data rate, output data rate, frame size and available space in the buffer.

12. A method according to claim 11, wherein the buffer conditions comprise a condition that a frame received exceeds a threshold frame size.

13. A method of operating a wireless receiver comprising:
receiving frames from a wireless transmitting station; and
when buffer overflow conditions are met, mimicking degraded radio conditions for at least a subset of the frames received to induce a rate adaptation mechanism at the transmitting station;
wherein mimicking degraded radio conditions comprises:
stopping acknowledging of at least a subset of the frames received at one or more data rates by applying a mask to a list of accepted data rates to remove the one or more data rates from the list, the mask defining one of: a set of rates to be excluded from the list of accepted data rates and a set of rates which are to be included within the list of accepted data rates, wherein the mask is applied for frames exceeding a threshold size; and
dropping the frames exceeding the threshold size according to the masked list of accepted data rates, and the method further comprising:
when buffer overflow conditions are subsequently not met, gradually returning to normal operation by gradually increasing the list of accepted data rates until the list includes all supported rates.

14. A method of operating a wireless receiver comprising:
receiving frames from a wireless transmitting station; and
when buffer overflow conditions are met, mimicking degraded radio conditions for at least a subset of the frames received to induce a rate adaptation mechanism at their transmitting station;
wherein mimicking degraded radio conditions comprises:
stopping acknowledging of at least a subset of the frames received at one or more data rates by applying a mask to a list of accepted data rates to remove the one or more data rates from the list, the mask defining one of: a set of rates to be excluded from the list of accepted data rates and a set of rates which are to be included within the list of accepted data rates, wherein the mask is applied for frames exceeding a threshold size; and
dropping the frames exceeding the threshold size according to the masked list of accepted data rates, and the method further comprising:
when buffer overflow conditions are met, entering a power save mode; and
subsequently, when no frames are received from a wireless transmitting station, exiting the power save mode and stopping mimicking degraded radio conditions.

* * * * *

UNITED STATES PATENT AND TRADEMARK OFFICE
CERTIFICATE OF CORRECTION

| | | |
|---|---|---|
| PATENT NO. | : 8,654,639 B2 | Page 1 of 1 |
| APPLICATION NO. | : 12/355005 | |
| DATED | : February 18, 2014 | |
| INVENTOR(S) | : Timothy Condren Smith | |

It is certified that error appears in the above-identified patent and that said Letters Patent is hereby corrected as shown below:

On the title page, column 2, below item (56), under "Primary Examiner", delete "Kimbrom T Hailu" and replace with --Kibrom T. Hailu--.

In the Specification

At column 3, line 62, delete "buffer 106" and replace with --buffer 105--.

At column 7, line 29, delete "powersave" and replace with --power save--.

Signed and Sealed this
Twenty-seventh Day of May, 2014

Michelle K. Lee
*Deputy Director of the United States Patent and Trademark Office*